United States Patent [19]

Rao

[11] Patent Number: 5,094,411
[45] Date of Patent: Mar. 10, 1992

[54] CONTROL CONFIGURED VORTEX FLAPS

[75] Inventor: Dhanvada M. Rao, Yorktown, Va.

[73] Assignee: Vigyan, Inc., Hampton, Va.

[21] Appl. No.: 600,595

[22] Filed: Oct. 19, 1990

[51] Int. Cl.$^5$ ................................................ B64C 9/00
[52] U.S. Cl. .................................. 244/214; 244/90 R
[58] Field of Search ............ 244/213, 214, 199, 90 R, 244/75 A, 75 R

[56] References Cited

U.S. PATENT DOCUMENTS

| | | | |
|---|---|---|---|
| 2,070,705 | 2/1937 | Barnhart | 244/214 |
| 2,941,751 | 6/1960 | Gagarin | 244/199 |
| 2,997,260 | 8/1961 | Locke, Jr. | 244/199 X |
| 3,143,317 | 8/1964 | Walley et al. | 244/214 |
| 3,471,107 | 10/1969 | Örnberg | 244/199 |
| 3,734,432 | 5/1973 | Low | 244/75 A |
| 3,831,885 | 8/1974 | Kasper | 244/214 X |
| 4,132,375 | 1/1979 | Lamar | 244/90 R |
| 4,146,200 | 3/1979 | Borzachillo | 244/75 R |
| 4,161,300 | 7/1979 | Schwaerzler | 244/90 R |
| 4,293,110 | 10/1981 | Middleton | 244/214 |
| 4,399,970 | 8/1983 | Evans | 244/214 |
| 4,485,992 | 12/1984 | Rao | 244/214 X |
| 4,598,888 | 7/1986 | Beteille | 244/76 A |
| 4,729,528 | 3/1988 | Borzachillo | 244/90 R |
| 4,790,494 | 12/1988 | Kohn | 244/214 X |

Primary Examiner—Joseph F. Peters, Jr.
Assistant Examiner—Carla Mattix
Attorney, Agent, or Firm—Wallace J. Nelson

[57] ABSTRACT

Individually deflectable, segmented, vortex flaps are provided on the leading edges of a delta wing supersonic aircraft to permit selective lateral and directional control moments to be created on the aircraft at high angles of attack, where conventional elevons and rudders have become ineffective. By selectively deflecting the segmented vortex flaps simultaneously in the same direction or differentially, the lateral and directional control of high-swept, thin wing, supersonic speed aircraft, at high angles of attack, is improved.

11 Claims, 7 Drawing Sheets

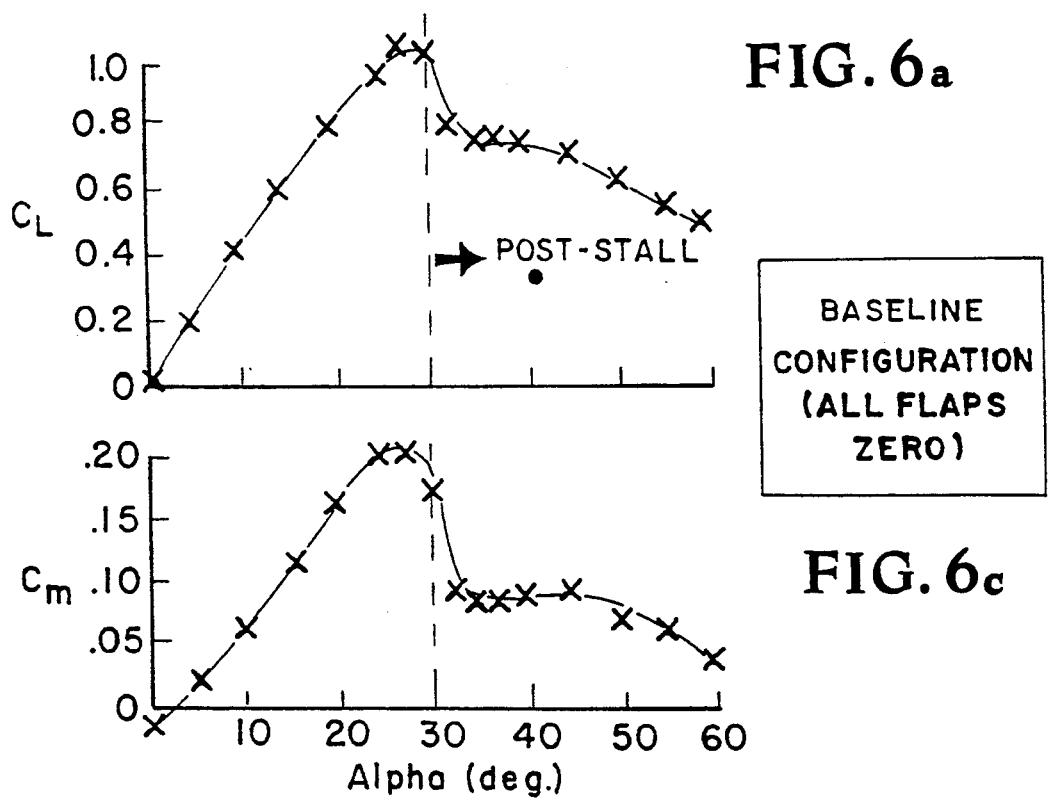
FIG. 6a
FIG. 6c
FIG. 6b
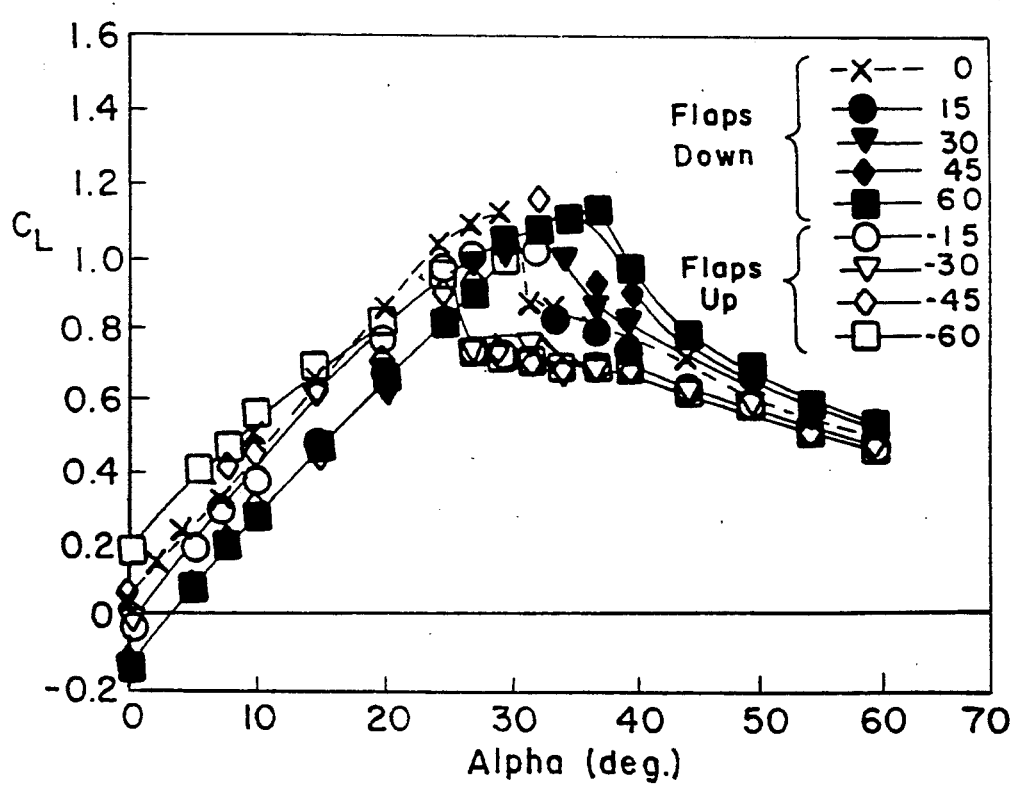
FIG. 7

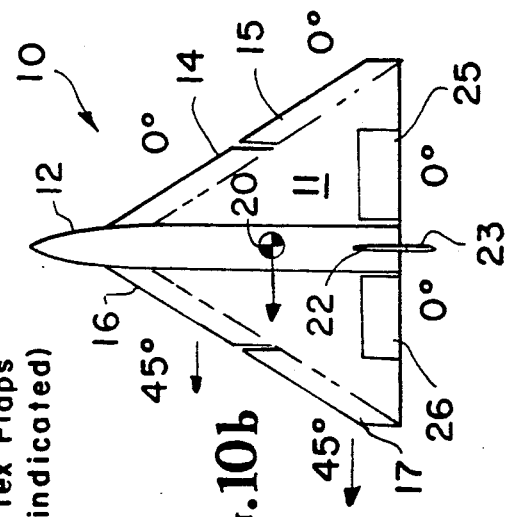
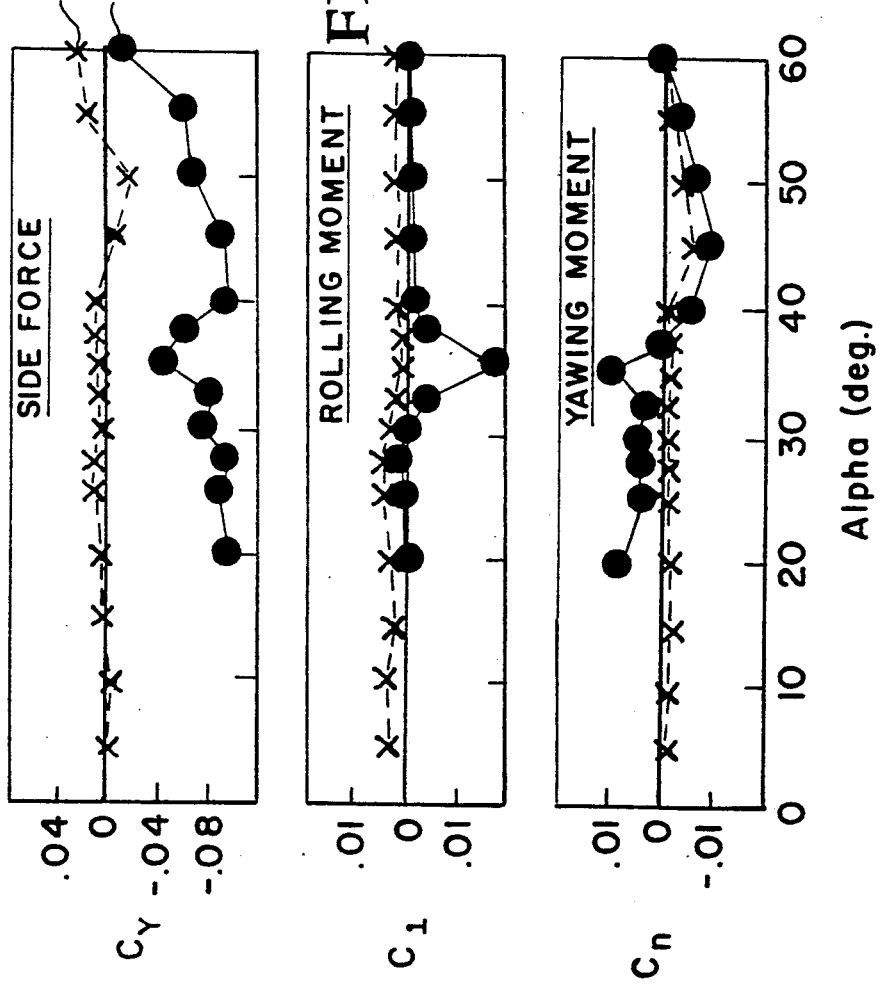
FIG. 10a
FIG. 10b
FIG. 10c
FIG. 10d

CONTROL CONFIGURED VORTEX FLAPS

ORIGIN OF THE INVENTION

This invention was made with Government support under Contract NAS1-17919 awarded by the National Aeronautics and Space Administration. Accordingly, the U.S. Government has certain rights in the invention.

FIELD OF THE INVENTION

The invention relates generally to aircraft controls, and relates specifically to segmented leading edge vortex flaps that improve the controllability and agility of highly-swept wing aircraft at high angles of attack.

BACKGROUND OF THE INVENTION

The use of vortex flaps as a leading edge device for reducing the lift-dependent drag of highly-swept, thin wing aircraft that are prone to leading edge flow separation and vortex formation, has been extended and adapted for aircraft control, particularly at high angles of attack where conventional trailing edge surfaces lose effectiveness. Down-deflected vortex flaps capture the vortex suction on their upper surfaces to generate an aerodynamic thrust force component that results in drag reduction. Conversely, up-deflection of flaps magnifies the vortex to thereby increase wing lift accompanied by a drag force on the flaps. The present invention combines the advantageous features of up and down deflected vortex flaps to induce thrust and drag forces in order to generate directional control momemets. Similarly, the differential operation of the flaps creates unequal lift increments on the wing panels to generate lateral moments. The segmented, differentially actuated flaps of the present invention thereby improve the ability and agility of high-swept thin wing aircraft during maneuvering at high angles of attack.

SUMMARY OF THE INVENTION

It is therefore an object of the present invention to provide a more versatile leading edge vortex flap system for improving the subsonic performance and maneuverability of highly swept, thin wing, supersonic aircraft.

Another object of the present invention is to provide segmented leading edge vortex flaps that, in suitable deployment, can generate lateral and directional control moments on supersonic aircraft during high angle-of-attack maneuvering when the conventional elevons and rudders have become ineffective.

An additional object of the present invention is to provide a vortex flap system that produces substantial roll and yaw aircraft control effectiveness at post-stall angles of attack with relatively small or favorable cross-moments.

A further object of the present invention is a leading edge vortex flap system that in combination with trailing edge flaps acts to reduce the aircraft landing speed and is also capable of producing maneuver drag reduction.

According to the present invention, the foregoing and additional objects are obtained by providing an aircraft having a delta-type wing with highly swept thin leading edges. Two hinged flap segments are provided side-by-side on each of the leading edge portions of the wing, such that together they comprise a substantial spanwise extent of the leading edges. The forward (or inner) flap segments lie forward of the aircraft center of gravity, whereas the rear (or outer) segments are located aft of the center of gravity. Each of the four leading edge flap segments is independently deflectable upwards or downwards up to 60 degrees angle in either direction. In addition, wing trailing edge flaps are provided on either side of the aircraft and deflectable up or down, together or oppositely. Further, a rudder is provided at the aft end of the fuselage. The trailing edge flaps and rudder are used for pitch, direction and lateral control in the conventional manner at low and moderate angles of attack. At high angles of attack when airflow separation on the wings renders the conventional control surfaces relatively ineffective, the segmented leading edge flaps of the present invention are employed to provide pitch, directional and lateral control. Thus, the overall angles of attack range of the aircraft for aerodynamic conrollability is substantially extended by the use of the segmented leading edge flaps of the present invention. The segmented flaps are also usable in the conventional manner when equally deflected downwards for maneuver drag reduction.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein:

FIG. 6 is a graphic illustration of typical lifting and pitching moment characteristics of the baseline configuration, or undeflected, segmented flaps of the present invention;

FIG. 7 is a graphic representation of the lift characteristics of the segmented leading edge flaps of the present inventon deflected symmetrically up or down at the various degrees shown;

FIG. 10 is a graphic representation of the aircraft side force, rolling moment and yawing moment characteristics with both segments of the leading edge flaps on the left side being deflected down at 45 degrees;

DETAILED DESCRIPTION

Figure 1:
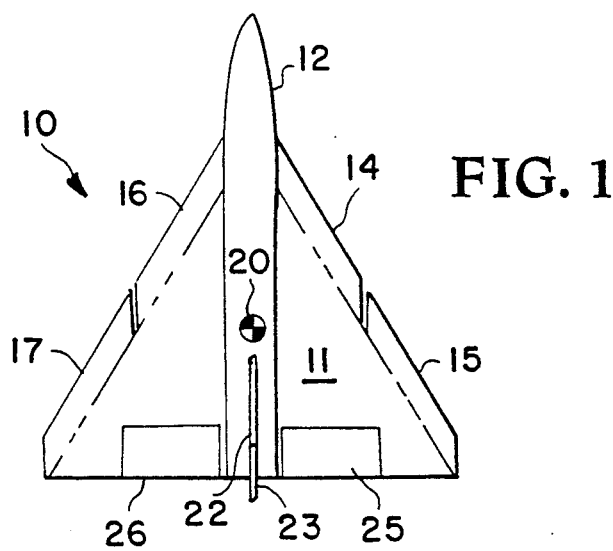
FIG. 1 is a top plan view of an exemplary supersonic aircraft configuration employing the segmented leading edge flap system of the present invention.
Figure 2:
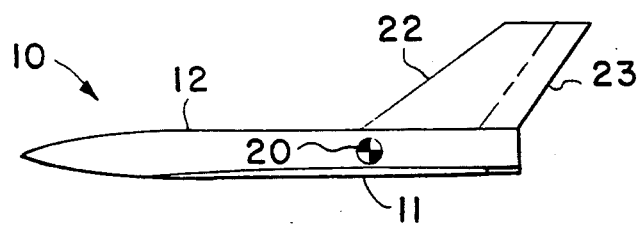
FIG. 2 is a side view of the aircraft shown in FIG. 1.

Referring now to the drawings, and more particularly to FIGS. 1 and 2, there is shown an exemplary supersonic aircraft configuration, designated generally by reference numeral 10. Aircraft 10 provided with a thin delta wing 11 having a leading edge sweep of approximately 60 degrees and provided with sharply beveled leading and trailing edges. Delta wing 11 is affixed in a low wing position to a substantially cylindrical fuselage 12. Each leading edge of wing 11 is provided with segmented leading edge flaps, as designated by reference numerals 14, 15, and 16, 17. As shown, the forward leading edge flap segments 14, 16 extend from the forward wing root area to an area on the wing leading edge essential perpendicular to the vehicle center of gravity 20. Flap segments 15, 17 extend from respective flap segments 14, 16 aft of the vehicle center of gravity 20 along the leading edge of wing 11 to the wing tip. A suitable empennage assembly 22, including a rudder 23, extends vertically from the aft portion of fuselage 12 in a conventional manner. A pair of elevons, or trailing edge flaps, 25, 26 are disposed on the opposite sides of fuselage 12 at the aft end of wing 11.

Figure 3:
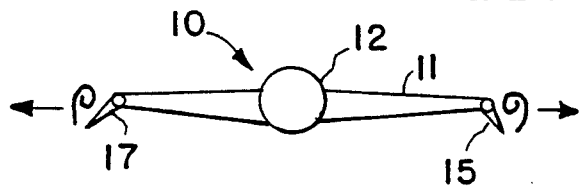
FIG. 3 is a somewhat schematic rear view of the aircraft shown in FIG. 1 with the segmented leading edges flaps thereon deflected in the down or positive positon.
Figure 4:
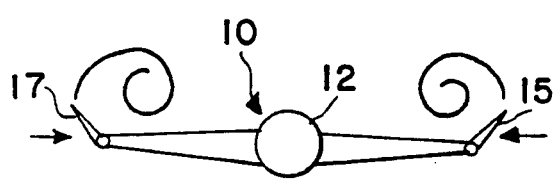
FIG. 4 is a view similar to FIG. 3 and illustrating the segmented leading edge flaps deflected in the upward or negative position.
Figure 5:
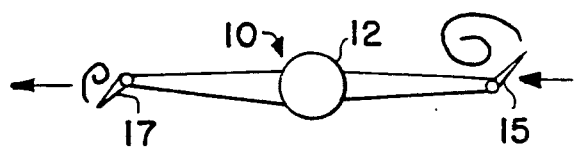
FIG. 5 is a view similar to FIGS. 3 and 4 and illustrating the segmented leading edge flaps differentially deflected.

Referring now to FIGS. 3-5, various segmented flap deflections are schematically illustrated. Only the rear flap segments are visible in these schematic views but it is to be understood that the forward flap segments may be rotated or deflected to the same or reverse positions as shown in these illustrations. In FIG. 3, segmented flaps 15 and 17 (and 14, 16 not visible in this FIG.) are deflected at essentially 45 degrees in the down or positive position. This segmented flap deflection influences drag reduction during flight maneuvering. The arrows in FIGS. 3-5 indicate the side force contribution due to the segmented flap deflections.

In FIG. 4, segmented flaps 15 and 17 (and 14, 16 not visible in this FIG.) are rotated or deflected approximately 45 degrees to the up or negative position. This segmented flap deflection is employed to increase vehicle lift and drag during a land maneuver.

In FIG. 5, both segments 14, 15 on the right side of aircraft 10 are deflected approximately 45 degrees up or in the negative position, while segments 16, 17 are deflected approximately 45 degrees down or in the positive position. This differential flap deflection is employed to create a rolling moment on aircraft 10 as indicated by the opposite direction of the force arrows (not designated). The curled lines in each of FIGS. 3-5 (not designated) show the location and direction of vortices emanating from the deflected segmented flaps.

It is to be understood that each of the flap segments 14, 15, 16 and 17 is individually actuated to positive (down) or negative (up) deflection angles. Any appropriate combination of individual flap segment deflection may be selected to yield the desired effect on the aircraft flight mission. For example, although not specifically shown in these FIGS., but clearly understandable therefrom, other possible segmented flap deflection combinations include (a) forward segments 14, 16 deflected down while aft segments 15, 17 remain neutral, or undeflected, as would be employed for a pitch down aircraft manuever; (b) forward segments 14, 16 deflected up while aft segments 15, 17 remain neutral, or undeflected, as would be employed for a pitch up maneuver; (c) both segments on one side, e.g. 14, 15 deflected down or positively, while segments 16, 17 on the opposite side remain in a neutral or reverse deflected position to produce a direct side force on the aircraft; and the reverse positioning of the respective side segments to create a direct side-force on the opposite side of the aircraft; (d) segments deflected on one side, e.g. segments 14, 17 deflected in one direction while segments 15, 16 remain neutral or are deflected in the opposite direction to create a yawing moment on the aircraft.

The state-of-the art fly-by-wire control technology is adaptable to implement any of the various aerodynamic control modes described hereinbefore.

Referring now more particularly to FIG. 6, a graphic illustration of the lifting ($C_L$) and pitching ($C_M$) characteristics for the baseline configuration or with flaps 14, 15, 16 and 17 of aircraft 10, all in the undeflected or neutral position, is shown. The abrupt drop of lift immediately after reaching maximum lift at alpha equals ±30 degrees, accompanied by a stable break of pitching moment, indicates a collapse of lift in the wing apex region as the vortex breakdown moves forward to the fuselage leading edge junction. These lift characteristics define the angle of attack range greater than 30 degrees as the post-stall region, where aerodynamic control potential of vortex flaps is of particular interest.

In FIG. 7, a graphic illustration of the lift characteristics for aircraft 10 when all flap segments 14, 15, 16 and 17 are symmetrically deflected in the up or down positions. As shown, the down-deflected flaps shift the lift curve towards higher angles of attack, and also progressively moderate the abruptness of stall. This is consistent with the vortex suppression effect of positive leading edge camber. Conversely, vortex augmentation caused by the up-deflected flaps results in a lift increase at the lower angles of attack but accelerates the onset of stall due to an earlier vortex breakdown.

Figure 8:
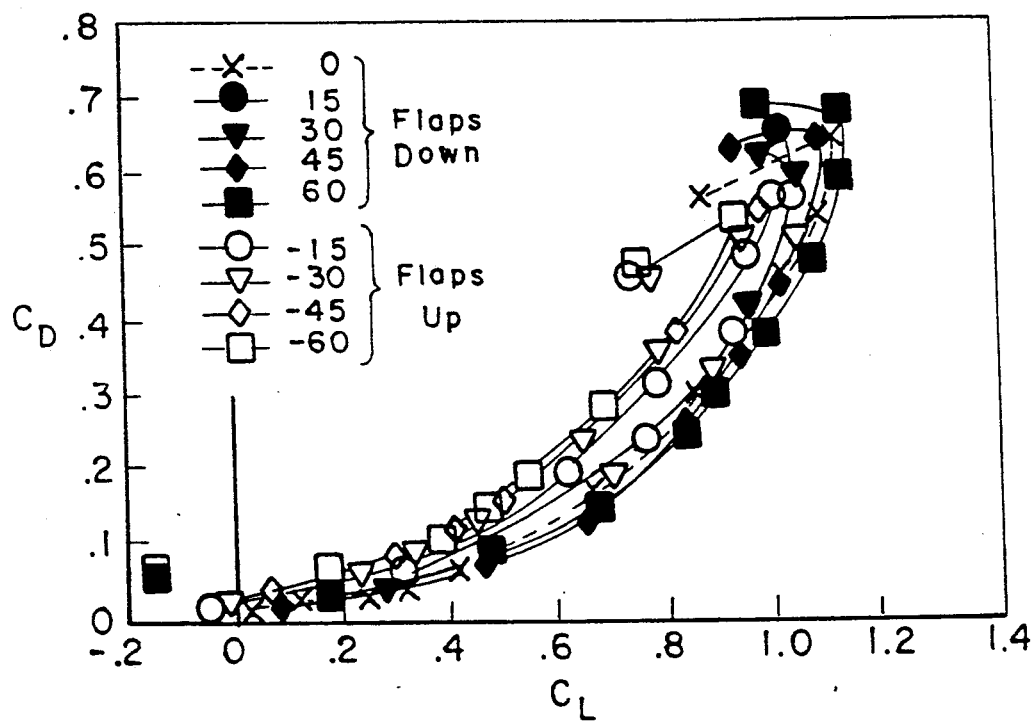
FIG. 8 is a graphic representation of the drag polars of the segmented leading edge flaps of the present invention deflected symmetrically up or down at the various degree positions shown.

FIG. 8 graphically illustrates the drag polar on aircraft 10 when flap segments 14, 15, 16 and 17 are symmetrically deflected up or down at various angles between ±60 degrees. The drag reductions measured with down-deflected flaps at the higher lift coeffients verify that the segmented flaps can still be employed in the conventional mode for enhanced aircraft maneuverability. The drag increase at negative deflections on the other hand can be utilized to reduce the landing speed. For control applications of the vortex flaps 14, 15, 16 and 17, the aerodynamic characteristics of (a) magnitude of side force, (b) persistence of side force at post-stall angles of attack and (c) sensitivity and linearity of side force with flap deflection angle are of primary interest.

Figure 9:
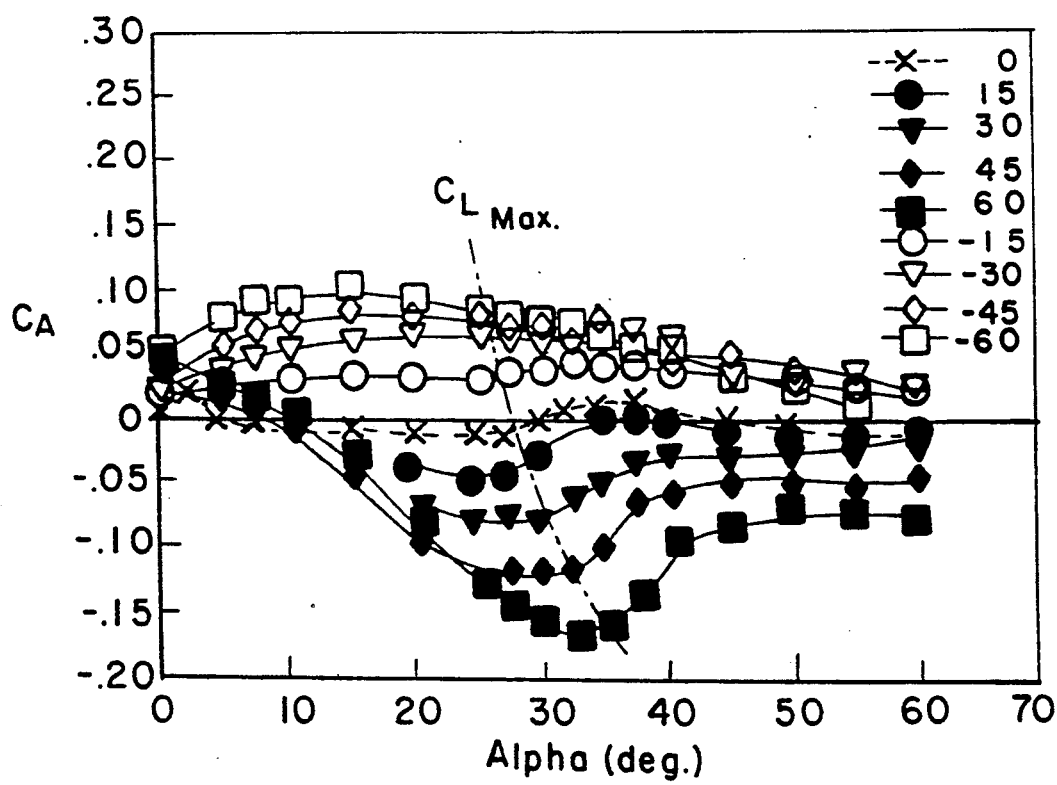
FIG. 9 is a graphic representation of the axial force characteristics of the segmented leading edge flaps of the present invention deflected symmetrically up or down at the various degree positions shown.

FIG. 9 graphically illustrates the axial force characteristics of aircraft 10 when leading edge flap segments 14, 15, 16 and 17 are symmetrically deflected up or down at various angles between ±60 degrees. These axial force characteristics provide an indication of the thrust-drag potential of the symmetrically deflected flaps. As indicated, the down-deflected flaps attain maximum thrust effectiveness around $C_L$ max and a significant level of thrust force persists in the post-stall region for flap angle of 30 degrees and greater. The post-stall axial force, and consequently the side force, is roughly proportional to flap angle in the range of 30 to 60 degrees. Similarly, up-deflected flaps produce a drag force roughly in proportion to flap angle up to the angle for maximum lift. From these axial force characteristics, it may be inferred that substantial side-force will be generated by simultaneous but opposite deflection of the right and left leading edge flaps, between angle of attack of 20 degrees up to nearly 60 degrees.

FIG. 10 is a graphic illustration of the side force rolling moment and yawing moment on aircraft 10 when left side flap segments 16, 17 are deflected in a positive direction (down) at 45 degrees while right side flap segments 14, 15 and elevons 25, 26 are maintained at the zero degree or non-deflected position. The arrows (not designated) indicate the side force direction on aircraft 10. By deflecting both flap segments on one side a "side-step" maneuver may be employed for aircraft 10 as long as the accompanying roll and yaw effects are not excessive. As graphically shown, a substantial side-force coefficient can be generated over the angle of attack range, while the rolling and yawing moments remain within controllable limits.

FIG. 11 graphically illustrates the directional control characteristics of aircraft 10 which differential leading edge flap deflection compared with rudder 23 control. Measurements for this graphic illustration were taken with segmented flaps 14 and 17 deflected down, or in a positive 45 degree position, while segmented flaps 15, 16 were deflected 45 degrees up or in the negative direction. This differential flap deflection is employed to induce a turning moment for aircraft 10 about its center of gravity 20 in the direction of the arcuate arrow (not designated).

FIG. 11 also graphically indicates the directional control characteristics for aircraft 10 when the segmented flaps 14, 15, 16 and 17 and rudder 23 are deflected in a reverse direction from that shown in the aircraft diagram. In the latter situation, the direction of the turning moment on aircraft 10 would also be reversed. In each plotted situation, elevons 25, 26 remain at the zero degree or undeflected position. As illustrated, the rudder power declines rapidly between alpha angles of 30 to 40 degrees, while the yawing moment provided by the vortex flaps is virtually undiminished to the deflection alpha angle of 60 degrees, and the induced rolling moment remains relatively small.

Referring now to FIG. 12, the lateral control characteristics of aircraft 10, with differential leading edge flap deflection, plus elevon deflections at the indicated positive and negative angles in the diagram, are shown. Also plotted are the values obtained for deflection angles opposite to those indicated in the diagram. These plots are graphically compared with the aircraft control characteristics produced by deflection of elevons 25, 26 alone. In the diagram, flap segments 14, 15 and elevon 25 on the right side of aircraft 10 are all deflected up on in the negative direction, while flap segments 16, 17 and elevon 26 on the left side of aircraft 10, are all deflected down or in the positive direction. This differential flap and elevon deflection produces side forces on aircraft 10 in the direction of the straight arrows (not designated), while also inducing aircraft roll in the direction of the arcuate arrow (also not designated). When the deflection angles for the segmented flaps 14, 15, 16 and 17 and elevons 25, 26 are reversed, the side and roll forces on aircraft 10 are also reversed. As illustrated, the elevons alone produce only about half of their low alpha roll power in the post-stall region whereas the combination of the elevons with the vortex flaps yield a practically undiminished roll power to alpha angle of 60 degrees. The induced yawing moment in the high-alpha region remains relatively small.

Figure 13B:
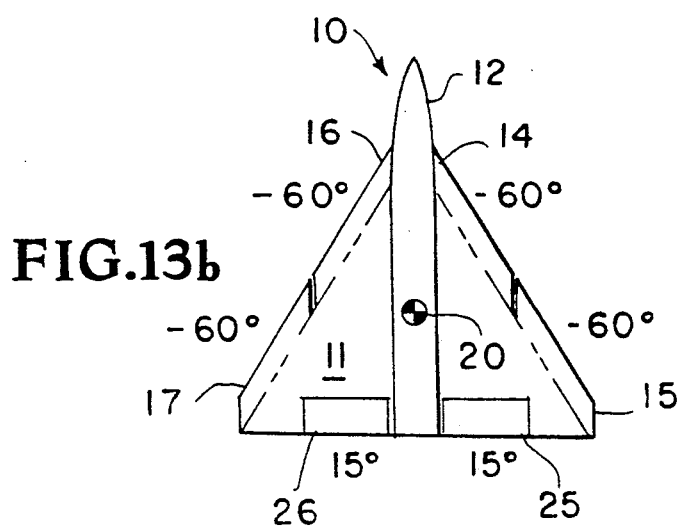
FIG. 13 is a graphic illustration of aircraft pitching moment versus lift coefficient with up-deflected segmented leading edge flaps plus elevons or trailing edge flaps.
Figure 13A:
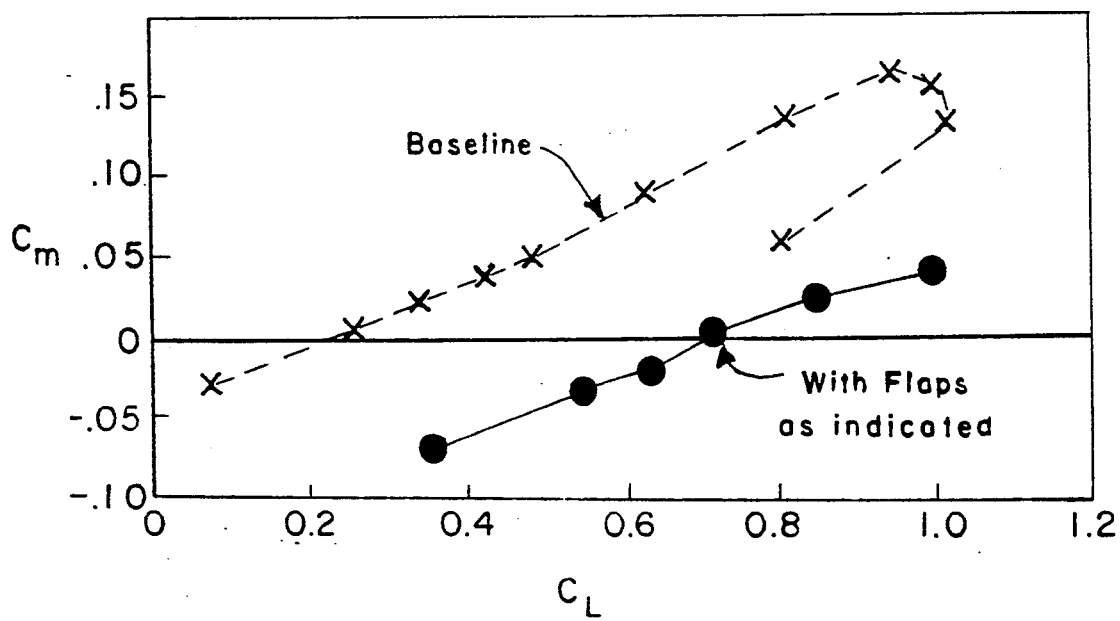

In FIG. 13, a graphic illustration of the aircraft 10 pitching moment versus lift coefficient with up-deflected leading edge flap segments 14, 15, 16 and 17 plus down-deflected elevons 25, 26, and compared with baseline configured flaps (all at zero degrees or undeflected), is shown. The simultaneous increments of lift and drag obtained by up-deflected vortex flaps have potential for reducing the landing speed, provided a trim condition can be attained at moderately low angles of attack. Taking advantage of a longitudinally unstable configuration, trailing edge flaps can be used to balance the nose-up moment increment of negatively deflected vortex flaps to yield a high value of the trimmed lift coefficient.

From the above description, it is readily seen that the segmented leading edge vortex flaps of the present invention provides improved maneuver capability for delta wing supersonic type aircraft. These capabilities include the generation of lateral and directional control moments at high angles of attack, as well as substantial roll and yaw control effectiveness at post-stall angles of attack, i.e. above 30 degrees and with very little cross moments. Also the potential of up-deflected flap segments in combination with trailing edge flaps to reduce the aircraft landing speed is indicated, as is the additional maneuver drag reduction obtained when the segmented vortex flaps are deployed in a conventional sense.

By dividing the aircraft wing leading edge into two independently actuated segments forward and aft of the aircraft center of gravity, a suitable combination of vortex forces are generated by appropriate deflections of the segments to yield lateral/directional control moments, particularly at post-stall angles of attack where conventional trailing edge type aerodynamic controls tend to degrade. In an appropriate differential mode, the leading edge flap segments of the present invention produced sustained directional control above the angle of attack when a conventional rudder becomes ineffective. Also, lateral control with differential vortex flaps in combination with conventional elevons was sustained up to 60 degrees. In directional, as well as lateral control modes, the cross-induced moments were small. The pure side-force generation for "side-step" maneuvers and high lift/high drag for shortened landing capabilities of the leading edge segmented vortex flaps further expand the novelty of the present invention.

Although the invention has been described in reference to specific embodiments therof, it is not so limited and there are many modifications and variations of the invention that will be readily apparent to those skilled in the art in the light of the above teachings. For example, the invention is equally applicable to flying wing type, single and multi-engine aircraft and to supersonic aircraft having a centrally disposed fuselage and a thin highly swept delta wing disposed in a low wing position thereon.

It is therefore to be understood that, within the scope of the appended claims, the invention may be practiced other than as specifically described herein.

What is claimed as new and desired to be secured by Letters Patent of the United States is:

1. Aerodynamic control apparatus for an aircraft comprising, in combination:

a supersonic aircraft having a highly swept delta wing;

said highly swept delta wing having oppositely disposed thin and nearly sharply beveled leading and trailing edge portions;

a pair of deflectable leading edge flap segments disposed on each of said oppositely disposed beveled leading edge portions of said wing;

said pair deflectable leading edge flap segments including (a) a first flap segment extending along each entire oppositely disposed leading edge portion of said wing forward of a point on said wing leading edge essentially perpendicular to the center of gravity of said aircraft; and (b) a second segment extending aft from a point on each of said oppositely disposed wing leading edges essentially perpendicular to the center of gravity of said aircraft to the tip of said highly swept delta wing;

a pair of deflectable elevons disposed, one each, on said oppositely disposed beveled trailing edge portions of said highly swept delta wing;

an empennage assembly including a rudder disposed on the aft end of said aircraft;

wherein said leading edge flap segments, said elevons and said rudder are each individually deflectable to enhance aircraft directional and lateral control effectiveness.

2. A method of enhancing aircraft directional and lateral control effectiveness of a supersonic highly delta wing aircraft comprising the steps of:

providing a supersonic aircraft having a highly swept delta wing and provided with oppositely disposed beveled leading and trailing edge wing surfaces;

providing a pair of deflectable leading edge flap segments on each of the oppositely disposed leading edges of the aircraft delta wing;

providing an empennage assembly on the aft end of the aircraft and including a rudder;

providing an elevon on each of the oppositely disposed beveled trailing edges of the wings;

individually deflecting the deflectable leading edge flap segments, the elevons and the rudder to to enhance selective directional and lateral manuevering of the aircraft;

wherein the pair of deflectable leading edge flap segments on each of the oppositely disposed wing leading edges of the aircraft are deflected simultaneously in a negative direction to provide an increase in aerodynamic drag and vortex augmentation along with aircraft lift increase at lower angles of attack while accelerating the onset of stall due to an early vortex breakdown, and useful in reducing the aircraft landing speed.

3. A method of enhancing aircraft directional and lateral control effectiveness of a supersonic highly swept delta wing aircraft comprising the steps of:

providing a supersonic aircraft having a highly swept delta wing and provided with oppositely disposed beveled leading and trailing edge wings surfaces;

providing a pair of deflectable leading edge flap segments on each of the oppositely disposed leading edges of the aircraft delta wing;

providing an empennage assembly on the aft end of the aircraft and including a rudder;

providing an elevon on each of the oppositely disposed beveled trailing edges of the wing;

individually deflecting the deflectable leading edge flap segments, the elevons and the rudder to enhance selective directional and lateral manuevering of the aircraft;

wherein the pair of deflectable leading edge flap segments on one leading edge of the aircraft wing are selectively deflected in a positive or negative direction and the pair of deflectable leading edge flap segements on the opposite leading edge surface of the aircraft wing are maintained in non-deflected position to thereby influence the axial force, rolling moment, and yawing moment on the vehicle during a flight maneuver.

4. A method of enhancing aircraft directional and lateral control effectiveness of a supersonic highly swept delta wing aircraft comprising the steps of:

providing a supersonic aircraft having a highly swept delta wing and provided with oppositely disposed beveled leading and trailing edge wing surfaces;

providing a pair of deflectable leading edge flap segments on each of the oppositely disposed leading edges of the aircraft delta wing;

providing an empennage assembly on the aft end of the aircraft and including a rudder;

providing an elevon on each of the oppositely disposed beveled trailing edges of the wing;

individually deflecting the deflectable leading edge flap segments, the elevons and the rudder to enhance selective directional and lateral maneuvering of the aircraft; and including the step of deflecting one member of each pair of deflectable leading edge flap segments in a positive direction and deflecting the other member of each pair of deflectable leading edge flap segments in a negative direction to enhance the directional control characteristics of the aircraft.

5. A method of enhancing aircraft directional and lateral control effectiveness of a supersonic highly swept delta wing aircraft comprising the steps of:

providing a supersonic aircraft having a highly swept delta wing and provided with oppositely disposed beveled leading and trailing edge wing surfaces;

providing a pair of deflectable leading edge flap segments on each of the oppositely disposed leading edges of the aircraft delta wing;

providing an empennage assembly on the aft end of the aircraft and including a rudder;

providing an elevon on each of the oppositely disposed beveled trailing edges of the wing;

individually deflecting the deflectable leading edge flap segments, the elevons and the rudder to enhance selective directional and lateral maneuvering of the aircraft;

wherein each pair of deflectable leading edge flap segments constitutes a forward leading edge flap segment and a rear leading edge flap segment and wherein one of the forward leading edge flap segments of each pair is deflected in a positive direction and the opposite forward leading edge segment is deflected in a negative direction and wherein the rear leading edge flap segments are deflected in an opposite direction to that of the forward edge flap segments and including the step of deflecting the rudder to enhance directional control of the aircraft.

6. The method of claim 5 including the step of differentially deflecting the elevons to enhance the lateral control characteristics of the aircraft.

7. The method of claim 5 wherein the deflection of the leading edge flap segments in the positive direction is in the range of 30 to 60 degrees and the deflection of the leading edge flap segments in the negative direction is in the range of −30 to −60 degrees.

8. A method of enhancing aircraft directional and lateral control effectiveness of a supersonic highly swept delta wing aircraft comprising the steps of:
providing a supersonic aircraft having a highly swept delta wing and provided with oppositely disposed beveled leading and trailing edge wing surfaces;
providing a pair of deflectable leading edge flap segments on each of the oppositely disposed leading edges of the aircraft delta wing;
providing an empennage assembly on the aft end of the aircraft and including a rudder;
providing an elevon on each of the oppositely disposed beveled trailing edges of the wing;
individually deflecting the deflectable leading edge flap segments, the elevons and the rudder to enhance selective directional and lateral maneuvering of the aircraft; and
wherein both pairs of deflectable leading edge flap segments are deflected in the negative direction while the elevons are deflected in the positive direction to increase the pitching moment and lift coefficient of the aircraft.

9. The method of claim 8 wherein the deflectable leading edge flap segments are deflected approximately −60 degrees and the elevons are deflected approximately +15 degrees.

10. A method of enhancing aircraft directional and lateral control effectiveness of a supersonic highly swept delta wing aircraft comprising the steps of:
providing a supersonic aircraft having a highly swept delta wing and provided with oppositely disposed beveled leading and trailing edge wing surfaces;
providing a pair of deflectable leading edge flap segments on each of the oppositely disposed leading edges of the aircraft delta wing;
providing an empennage assembly on the aft end of the aircraft and including a rudder;
providing an elevon on each of the oppositely disposed beveled trailing edges of the wing;
individually deflecting the deflectable leading edge flap segments, the elevons and the rudder to enhance selective directional and lateral maneuvering of the aircraft;
wherein each pair of the deflectable leading edge flaps are differentially deflected in the range of −60 degrees to +60 degrees to enhance side step aircraft maneuvering.

11. A method of enhancing aircraft directional and lateral control effectiveness of a supersonic highly swept delta wing aircraft comprising the steps of:
providing a supersonic aircraft having a highly swept delta wing and provided with oppositely disposed beveled leading and trailing edge wing surfaces;
providing a pair of deflectable leading edge flap segments on each of the oppositely disposed leading edges of the aircraft delta wing;
providing an empennage assembly on the aft end of the aircraft and including a rudder;
providing an elevon on each of the oppositely disposed beveled trailing edges of the wing;
individually deflecting the deflectable leading edge flap segments, the elevons and the rudder to enhance selective directional and lateral maneuvering of the aircraft;
wherein the pair of deflectable leading edge flap segments on one leading edge of the aircraft wing are selectively deflected 20 to 60 degrees in a positive direction and the pair of deflectable leading edge flap segments on the opposite leading edge surface of the aircraft wing are simultaneously deflected 20 to 60 degrees in a negative direction to thereby enhance the side-force maneuverability of the aircraft.

* * * * *

UNITED STATES PATENT AND TRADEMARK OFFICE
CERTIFICATE OF CORRECTION

PATENT NO. : 5,094,411
DATED : March 10, 1992
INVENTOR(S) : Dhanvada M. Rao

Figure 11C:
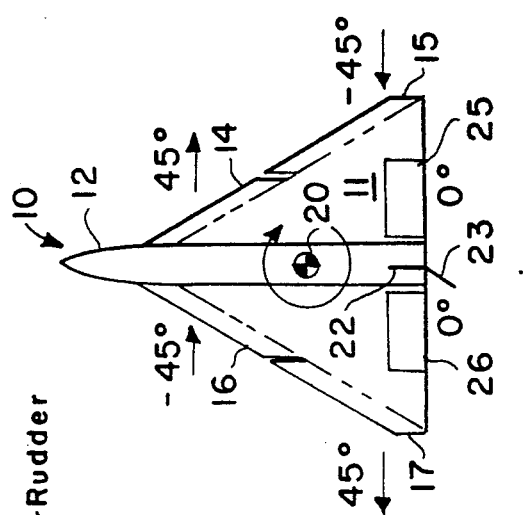
FIG. 11 is a graphic illustration of the aircraft directional control characteristics of the present invention with differential leading edge flap deflection as indicated and as compared with rudder control.
Figure 11A:
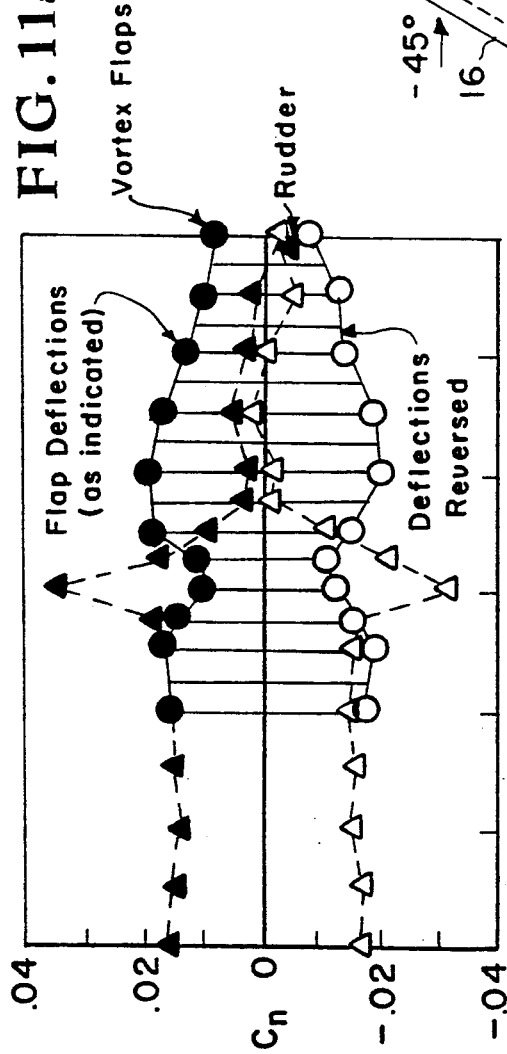
Figure 11B:
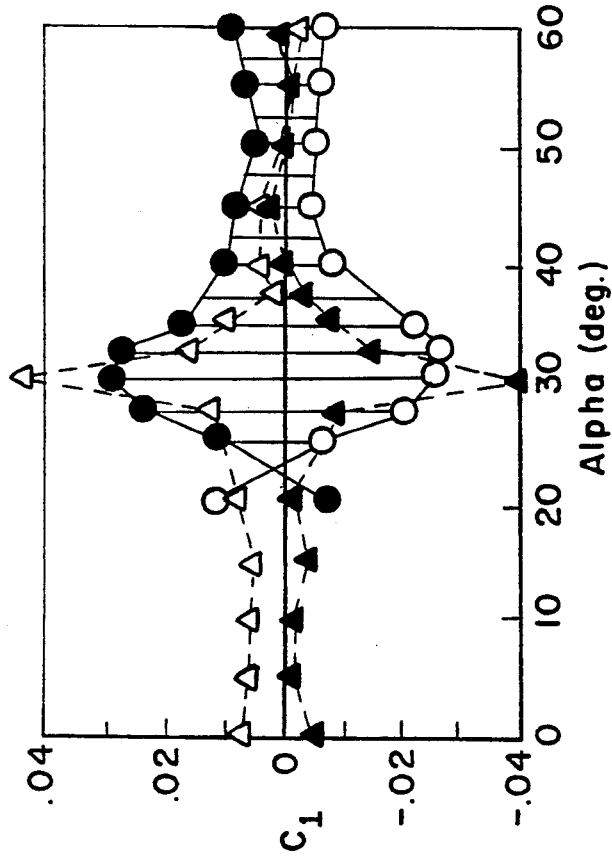

It is certified that error appears in the above-indentified patent and that said Letters Patent is hereby corrected as shown below:

Column 2, line 45, delete "FIG. 6 is a graphic illustration" and insert --FIGS. 6a and 6b are graphic illustrations--.

line 49, before "FIG. 7", insert as a new paragraph --FIG. 6c depicts the legend for FIGS. 6a and 6b.--.

line 61, delete "FIG. 10 is a graphic representation" and insert --FIGS. 10a, 10b, and 10c are respective graphic representations--.

line 64, after "degrees" insert --as depicted in FIG. 10d--.

line 65, delete "FIG. 11 is a graphic illustration" and insert --FIGS. 11a and 11b are graphic illustration--.

line 67-68, delete "indicated" and insert --depicted in FIG. 11c--.

Figure 12C:
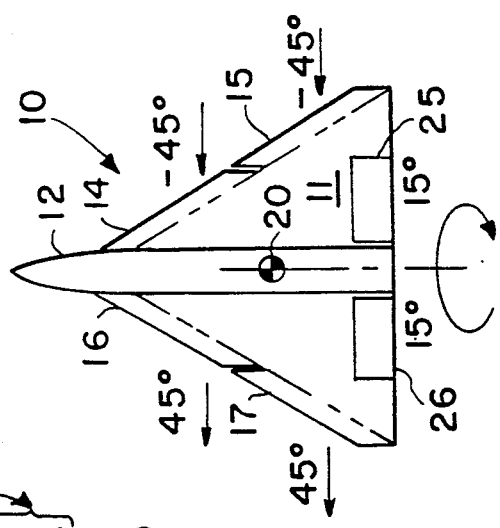
FIG. 12 is a graphic illustration of the aircraft lateral control characteristics of the present invention with differential leading edge flap deflection plus elevons and compared with elevons alone.
Figure 12A:
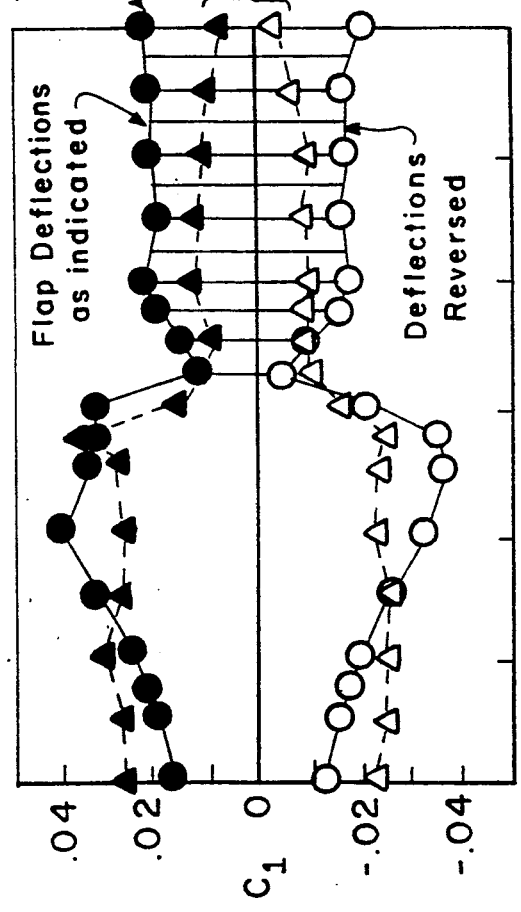
Figure 12B:
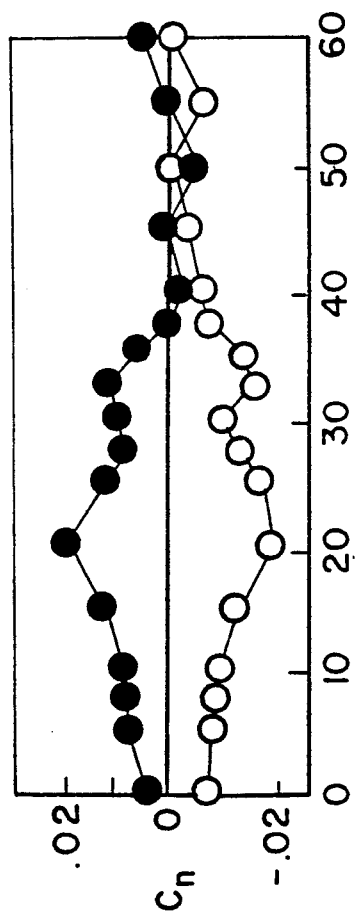

Column 3, line 1, delete "FIG. 12 is a graphic illustration" and insert --FIG. 12a and 12b are graphic illustrations--.

line 4, after "alone" insert-- , as depicted in FIG. 12c--.

line 5, delete "13" and insert -- 13a --.

UNITED STATES PATENT AND TRADEMARK OFFICE
CERTIFICATE OF CORRECTION

PATENT NO. : 5,094,411
DATED : March 10, 1992
INVENTOR(S) : Dhanvada M. Rao

It is certified that error appears in the above-indentified patent and that said Letters Patent is hereby corrected as shown below:

Column 3, line 8, delete "flaps" and insert--as depicted in FIG. 13b--.

Signed and Sealed this

Nineteenth Day of July, 1994

Attest:

BRUCE LEHMAN

Attesting Officer　　Commissioner of Patents and Trademarks